United States Patent
Gutt et al.

(10) Patent No.: US 12,028,714 B1
(45) Date of Patent: Jul. 2, 2024

(54) WIRELESS SIGNAL VALIDATION USING AN INDEPENDENT WIRELESS DATA LINK

(71) Applicant: Satelles, Inc., Reston, VA (US)

(72) Inventors: Gregory Gutt, Herndon, VA (US); Tim Flynn, New York, NY (US); Trevor Landon, Vienna, VA (US); David G. Lawrence, Santa Clara, CA (US); Michael L. O'Connor, Redwood City, CA (US); Rachel Schmalzried, San Jose, CA (US)

(73) Assignee: Satelles, Inc., Reston, VA (US)

( * ) Notice: Subject to any disclaimer, the term of this patent is extended or adjusted under 35 U.S.C. 154(b) by 333 days.

(21) Appl. No.: 17/391,647

(22) Filed: Aug. 2, 2021

(51) Int. Cl.
*H04W 12/10* (2021.01)
*G01S 19/05* (2010.01)
*H04L 9/32* (2006.01)
*H04W 12/06* (2021.01)
*H04W 12/106* (2021.01)
(Continued)

(52) U.S. Cl.
CPC .......... *H04W 12/106* (2021.01); *G01S 19/05* (2013.01); *H04L 9/3242* (2013.01); *H04W 12/06* (2013.01); *H04W 12/108* (2021.01); *H04W 12/122* (2021.01); *H04W 12/63* (2021.01); *H04W 84/06* (2013.01)

(58) Field of Classification Search
CPC ............. H04W 12/106; H04W 12/108; H04W 12/122; H04W 84/06
See application file for complete search history.

(56) References Cited

U.S. PATENT DOCUMENTS

| | | |
|---|---|---|
| 5,754,657 A | 5/1998 | Schipper et al. |
| 7,579,987 B2 | 8/2009 | Cohen et al. |

(Continued)

FOREIGN PATENT DOCUMENTS

KR 1833634 B1 * 3/2018 ........... G01S 19/015

OTHER PUBLICATIONS

Air Force Research Laboratory "Signal-in-Space Methods for Authentication of Satellite Navigation Signals" Sep. 27, 2017. pp. 1-33.
(Continued)

*Primary Examiner* — David J Pearson
(74) *Attorney, Agent, or Firm* — Lempia Summerfield Katz LLC

(57) ABSTRACT

For validation of wireless signals, a wireless receiver receives a validation signal that includes information from a target signal. By using digital signature, message authentication code (MAC), and/or hashing, the validation signal is verified to be from a trusted source. By comparing the information from the verified validation signal with the target signal, the target signal is confirmed to be genuine or not a spoofing signal. In one approach, the validation signal is provided from a different transmission source than the target signal. In another approach, modulation estimation rather than known modulation is used as the information for the validation signal for comparison with the target signal despite not knowing the spread pattern of the coding. In yet another approach, a one-way function is used to generate a pseudorandom code to spread a first component of the a first signal below the noise floor. The input to the one-way function is a second component sent at a time later than the time.

19 Claims, 6 Drawing Sheets

(51) Int. Cl.
  *H04W 12/108* (2021.01)
  *H04W 12/122* (2021.01)
  *H04W 12/63* (2021.01)
  *H04W 84/06* (2009.01)

(56) References Cited

U.S. PATENT DOCUMENTS

| | | | |
|---|---|---|---|
| 7,969,354 | B2 | 6/2011 | Levin et al. |
| 8,068,054 | B2 | 11/2011 | Levin et al. |
| 8,068,533 | B2 | 11/2011 | Levin et al. |
| 8,948,392 | B2 | 2/2015 | Chassagne |
| 9,088,420 | B2 | 7/2015 | Lawrence et al. |
| 9,507,026 | B2 | 11/2016 | Nichols |
| 9,857,476 | B2 | 1/2018 | Mathews et al. |
| 10,670,727 | B2 | 6/2020 | Revol et al. |
| 10,732,288 | B2 | 8/2020 | Syrjarinne |
| 2010/0283671 | A1* | 11/2010 | Levin ............... G01S 19/29 342/357.68 |
| 2013/0127664 | A1* | 5/2013 | Garin ............... G06F 21/42 342/357.63 |
| 2014/0351576 | A1* | 11/2014 | Enge ............... H04L 9/32 713/155 |
| 2014/0351886 | A1* | 11/2014 | Edge ............... H04W 12/069 726/3 |
| 2014/0368383 | A1* | 12/2014 | Wendel ............... H04B 17/336 342/357.59 |
| 2015/0226858 | A1 | 8/2015 | Leibner et al. |
| 2016/0178752 | A1 | 6/2016 | Davies et al. |
| 2017/0357009 | A1* | 12/2017 | Raab ............... G01S 19/35 |
| 2018/0372876 | A1* | 12/2018 | Syrjarinne ............... H04W 12/10 |
| 2019/0113625 | A1* | 4/2019 | Farmer ............... G01S 19/072 |
| 2019/0120970 | A1* | 4/2019 | Vigen ............... G01S 19/215 |
| 2019/0204450 | A1 | 7/2019 | Revol |
| 2022/0035044 | A1* | 2/2022 | Cookman ............... G01S 19/34 |

OTHER PUBLICATIONS

Ali Broumandan, et al. "GNSS Vulnerability to Spoofing Threats and a Review of Anti-Spoofing Techniques" Schulich School of Engineering. Jan. 2014. pp. 1-34.
Anderson, Jon M., et al. "Chips-message robust authentication (Chimera) for GPS civilian signals." Proceedings of the 30th International Technical Meeting of The Satellite Division of the Institute of Navigation (ION GNSS+ 2017). 2017. pp. 2388-2416.
Bin, Qian, et al. "GPS spoofing-based time synchronisation attack in advanced metering infrastructure and its protection." The Journal of Engineering Sep. 2020. (2020): 809-815.
Formaggio, Francesco, et al. "GNSS spoofing detection techniques by cellular network cross-check in smartphones." Proceedings of the 32nd International Technical Meeting of the Satellite Division of The Institute of Navigation (ION GNSS+ 2019). 2019. pp. 3904-3916.
Gamba, Micaela Troglia, Mario Nicola, and Beatrice Motella. "GPS Chimera: A Software Profiling Analysis." In Proceedings of the 33rd International Technical Meeting of the Satellite Division of The Institute of Navigation (ION GNSS+ 2020), pp. 3781-3793. 2020.
Grace Gao. "Cooperative GPS Signal Authentication from Unreliable Peers" University of Illinois. Oct. 2014. pp. 1-31.
Heng, Liang, Daniel B. Work, and Grace Xingxin Gao. "GPS signal authentication from cooperative peers." IEEE Transactions on Intelligent Transportation Systems 16.4 (2014): 1-12.
Heng, Liang, Daniel Chou, and Grace Xingxin Gao. "Cooperative GPS signal authentication from unreliable peers." Proceedings of the 27th International Technical Meeting of the Satellite Division of The Institute of Navigation (ION GNSS+ 2014). 2014.
Jansen, Kai, Nils Ole Tippenhauer, and Christina Popper. "Multi-receiver GPS spoofing detection: Error models and realization." Proceedings of the 32nd Annual Conference on Computer Security Applications. 2016. pp. 1-14.
Liang Heng, et al. Cooperative GNSS Authentication Reliability from Unreliable Peers. Sep. 2013. pp. 70-75. https://insidegnss.com/.
M. Troglia Gamba, et al. "GPS Chimera: A Software Profiling Analysis" Links. Sep. 2020. pp. 1-24.
Mark Psiaki, et al. "GPS Spoofing Detection System" University of Cornell. (2010). pp. 1-1.
Mitsubishi Electric "A Message Authentication Proposal for SatelliteBased Nation-wide PPP-RTK Correction Service" Sep. 20, 2019. pp. 1-19.
Neish, Andrew, Todd Walter, and J. David Powell. "SBAS data authentication: A concept of operations." Proceedings of the 32nd International Technical Meeting of the Satellite Division of The Institute of Navigation (ION GNSS+ 2019). 2019. pp. 1812-1823.
Oligeri, Gabriele, et al. "Drive me not: Gps spoofing detection via cellular network." Proc. 12th Conf. Secur. Privacy Wireless Mobile Netw.(WiSec). 2019. pp. 1-11.
Oligeri, Gabriele, Savio Sciancalepore, and Roberto Di Pietro. "GNSS spoofing detection via opportunistic IRIDIUM signals." Proceedings of the 13th ACM Conference on Security and Privacy in Wireless and Mobile Networks. Jul. 2020. pp. 1-11.
O'Hanlon, Brady W., et al. "Real-time GPS spoofing detection via correlation of encrypted signals." Navigation, Journal of the Institute of Navigation 60.4 (2013): 267-278.
Paul Montgomery. A Multi-Antenna Defense Receiver-Autonomous GPS Spoofy Detection. Mar. 2009. pp. 40-46. https://insidegnss.com/.
Psiaki, Mark L., et al. "GPS spoofing detection via dual-receiver correlation of military signals." IEEE Transactions on Aerospace and Electronic Systems 49.4 (2013): 1-15.
Rügamer, Alexander, et al. "Secure Position and Time Information by Server Side PRS Snapshot Processing." Proceedings of the 29th International Technical Meeting of the Satellite Division of the Institute of Navigation (ION GNSS+ 2016). 2016. pp. 3002-3017.
Sciancalepore, Savio, Gabriele Oligeri, and Roberto Di Pietro. "Shooting to the stars: secure location verification via meteor burst communications." 2018 IEEE Conference on Communications and Network Security (CNS). IEEE, 2018. pp. 1-9.
Scott, Logan. "Anti-spoofing & authenticated signal architectures for civil navigation systems." Proceedings of the 16th International Technical Meeting of the Satellite Division of The Institute of Navigation (ION GPS/GNSS 2003). 2003. pp. 1543-1552.
Tanwar, Sudeep, et al. "A systematic review on security issues in vehicular ad hoc network." Security and Privacy 1.5 (2018): e39. pp. 1-26.
U.S. Appl. No. 16/531,334, filed Aug. 5, 2019.
Navipedia "Galileo Public Regulated Service (PRS)" 2011. https://gssc.esa.int/navipedia/index.php/Galileo_Public_Regulated_Service_(PRS). pp. 1-4.

* cited by examiner

WIRELESS SIGNAL VALIDATION USING AN INDEPENDENT WIRELESS DATA LINK

BACKGROUND

The present embodiments relate to validation of wireless signals. Wireless signals include electromagnet waves like infrared (IR), radio frequency (RF), acoustic, laser, satellite, microwave, wi-fi, mobile communication systems, Bluetooth, radar, Vehicle-to-Vehicle (V2V), and short-range communications (DSRC), as well as other or future wireless technologies. Robots, industrial (mining, rail, micro-mobility, delivery, etc.), automotive, marine, aerial, agricultural, telecommunications, and medical devices often rely on wireless communication methods to transmit data, which transmissions may be susceptible to spoofing. Wireless signals may be spoofed, such as spoofing signals of a global navigation satellite system (GNSS), cellular network, handheld radio network, passive radar system, semi-autonomous or autonomous systems or another communications system. Spoofing is an intentional attack in which an adversary broadcasts a false version of the signal in order to cause the device receiving the signal to operate incorrectly, such causing a navigation receiver to generate a false time or location solution.

To counter spoofing, the presence of spoofed wireless signals is detected or the validity of the received wireless signal is verified. In one approach, private key encryption is used. To remove the threat of spoofing attacks, receivers have traditionally used encryption so that the target signal is unknown to spoofers until after it has been transmitted. This approach requires keying to be performed on the devices, increasing the need for such a device to be protected. Furthermore, this approach may be difficult to implement for commercial users. Other approaches are susceptible to spoofing as they do not: authenticate the actual waveform itself, particularly if a bad actor can replay the same data and/or duplicate the data message or signature; require public keys or control of the signal transmission to be validated; require access to a remote server or authentication network by the receiver; provide only indirect anti-spoofing capability; or require multiple receivers to communicate with each other.

SUMMARY

By way of introduction, the preferred embodiments described below include methods, computer readable storage media, and systems for validation of wireless signals. The wireless receiver receives a target signal and a validation signal. The validation signal includes information from the target signal. By using digital signature, message authentication code (MAC), and/or hashing, the validation signal is verified to be from a trusted source. By comparing the information from the verified validation signal with the target signal, the target signal is confirmed to be genuine or not a spoofing signal. In one approach, the validation signal is provided from a different transmission source, such as a communications network, than the target signal (e.g., target signal from a GNSS MEO satellite and validation signal from a low earth orbit (LEO) satellite). In another approach, coding estimation rather than known coding is used as the information for the validation signal for comparison with the target signal. This estimated coding may be compared (e.g., correlated) with the target signal despite not knowing the spread pattern of the coding to confirm that the target signal is genuine. In yet another approach, a one-way function is used to generate a pseudorandom code to spread a component of a first signal below the noise floor. The input to the one-way function is sent at a time later than the first signal. The one-way function could be a digital signature or hash chain. The input could be a hash chain link sent above the noise floor.

In a first aspect, a method is provided for validation of wireless signals. A radio frequency receiver wirelessly receives a target signal from a first source and a validation signal from a second source different than the first source. The validation signal is verified with a digital signature, message authentication code, or reverse hash chain check. The target signal is validated from the validation signal when the validation signal is verified.

In a second aspect, a system is provided for wireless validation. A receiver is configured to receive a first wireless signal from a first network and a second wireless signal from a second network different than the first network. A signal processor is configured to validate the first wireless signal from content of the second wireless signal.

In a third aspect, a system is provided for wireless validation. A reference receiver is configured to receive first wireless signals or data characterizing the first wireless signals. A signal processor is configured to generate a digital signature or message authentication code from the first wireless signals or the data and generate a validation signal from the digital signature or message authentication code and a hash chain link (tag). A first transmitter is configured to wirelessly transmit the validation signal to a user receiver configured to receive the validation signal from the first transmitter and to receive the first wireless signal from a second transmitter of a different communications network than the first transmitter.

In a fourth aspect, a method is provided for validation of wireless signals. A first receiver wirelessly receives a target signal and a validation signal. The validation signal includes coding estimated from a target signal. The estimated coding represents coding spread below the noise floor of the first receiver in the target signal and is compared (e.g., correlated) with the previously received target signal. The target signal is validated when the comparison is positive (e.g., a correlation peak from the correlating is in code phase with coding above the noise floor of the target signal).

The present invention is defined by the following claims, and nothing in this section should be taken as a limitation on those claims. Any one or more features discussed herein may be used alone or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND THE PRESENTLY PREFERRED EMBODIMENTS

Wireless signals from a transmitter are validated based on the content of the signals without the receiver having to contact a validation server. Two transmissions, a target signal to be validated and a validation signal, are used for validation. The validation signal transmission may be from a different communications system or from the same communications system with validation content estimated from the target signal. In one embodiment, the validation signal uses a hash link (aka, tag) from a hash chain. The chain of hash links is created for insertion into messages. A last hash link of the chain as created is loaded into the receiver. The other hash links are added to validation signals in a reverse order. Upon receipt of a validation signal, the receiver hashes the received hash link. If the results of the hashing match the pre-loaded last hash link of the chain, then the validation signal is validated or verified. Digital signature and/or a messaging authentication code may be used in addition to or alternative to the hashing for verifying the validation signal. The content of the validation signal representing the target signal may be used to then validate that there is no spoofing of the target signal.

In one embodiment, wireless signal validation is provided on a stand-alone receiver utilizing an independent, validated wireless data link. Two wireless signals, such as from different communications networks, are used to validate. The stand-alone receiver validates a target signal by receipt of a validation signal over an independent, wireless data link, verifying that the target signal as received was not spoofed. Signal security of wireless networks is improved without requiring reference to an authentication server or network. The security may be improved in wireless systems, such as satellite constellations, ground-based networks, and other signals of opportunity (SOOP), by providing the stand-alone receiver with the capability to validate target signals utilizing an independent, validated wireless data link.

Figure 1:
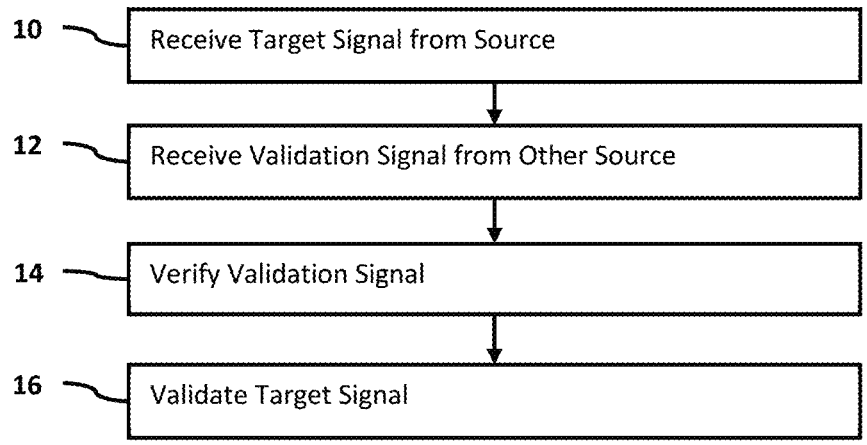
FIG. 1 is a flow chart diagram of one embodiment of a method for validation of a wireless signal.

FIG. 1 shows one embodiment of a method for validation of wireless signals. This method is directed to operation of the user receiver. A target signal received from a constellation or communications network is validated and/or authenticated. A validation signal, such as from a different constellation or communications network, is used to validate and/or authenticate the target signal.

The method is implemented by a receiver and/or the system of FIG. 2-3 or 5-8. For example in FIG. 2, the user receiver 22 receives the target signal from the transmitter 20 and the validation signal from the transmitter 21. The reference receiver 24 receives the target signal, and the signal processor 25 generates the validation signal for transmission by the transmitter 21. Other arrangements may be used.

The acts are performed in the order shown or another order. For example, act 16 is performed prior to or as an intermediary within act 14. Additional, different, or fewer acts may be provided. For example, acts for creating the validation signal are included.

In act 10, a radio frequency (RF) receiver wirelessly receives a target signal from a source (transmitter). The RF receiver is a user receiver, such as a receiver on a phone, vehicle, or other mobile device. The RF receiver may be fixed in place in other embodiments.

The target signal is a signal in space being utilized by user equipment, such as equipment including the RF receiver. Example target signals include signals from a LEO constellation (e.g., Iridium, SpaceX Starlink, OneWeb, small or nanosat constellation such as LeoSat, TeleSat, and Hongyan, or SpaceBEEs), GNSS (e.g., GPS, Galileo, GLONASS, or BeiDou), augmentation GNSS system (e.g., EGNOS, WAAS, or SBAS), regional navigation satellite system (e.g., NavIC or QZSS), reverse GNSS system for orbit determination (DORIS), real time kinematic systems providing corrections for GNSS (e.g., RTCM protocol emitted from base), cellular base station (e.g., Verizon, AT&T, or T-Mobile), Wi-Fi system (e.g., Wi-Fi transmitter operating pursuant to 802.11 ax, 802.11ac, 802.11b/g/n, or 802.11a), handheld communicators (e.g., FRS or GMRS), terrestrial media transmitter (e.g., TV, FM, or AM radio transmitters), ISM emission system (e.g., at 433 MHz or 915 MHz), microwave, mobile communication systems, Bluetooth, radar, Vehicle-to-Vehicle (V2V), and short-range communications (DSRC). For example, the target signal is for car-to-car, car-to-infrastructure, satellite-to-car, or sensor communications.

GNSS is designed for global PNT inclusive of constellations such as GPS, GLONASS, Galileo, and/or Beidou. In other cases, GNSS is a term more generally used to describe any satellite constellation that provides positioning, navigation, and timing (PNT) services on a global or regional basis. Some examples of GNSS include GPS, GLONASS, and Galileo that have satellites in MEO. While there are other examples of GNSS including BeiDou, Compass and others, such as the regional Quasi-Zenith Satellite System (QZSS), Indian Regional Navigation Satellite System (IRNSS) that have at least some satellites in other orbits. The term GNSS may be also be used in reference to Iridium as well as any other current or future systems or extensions of those systems and constellations that may be used for PNT applications whether or not they were designed originally for such.

In one embodiment, the target signal is a navigation signal, such as a positioning, navigation, timing (PNT) signal from a MEO or LEO satellite. For example, the receiver receives the target signal from the GNSS. In other embodiments, the signal is a radar signal for detecting objects. In yet other embodiments, the signal is an RF communications signal.

The user receiver captures and stores samples of the target signal to be validated while receiving. A sequence of signals may be sent. The target signal may be one of the signals or periodically included in the sequence of signals. For example, some of the signals are to be validated. In other embodiments, all of the received signals are to be validated.

In act 12, the RF receiver wirelessly receives a validation signal. The same RF receiver, using the same or different antenna as used for the target signal, receives the validation signal. A different RF receiver part of the same user equipment may be used to receive the validation signal. RF receivers operating at different frequency bands or formats may form the RF receiver used to receive the target and validation signals.

Figure 2:
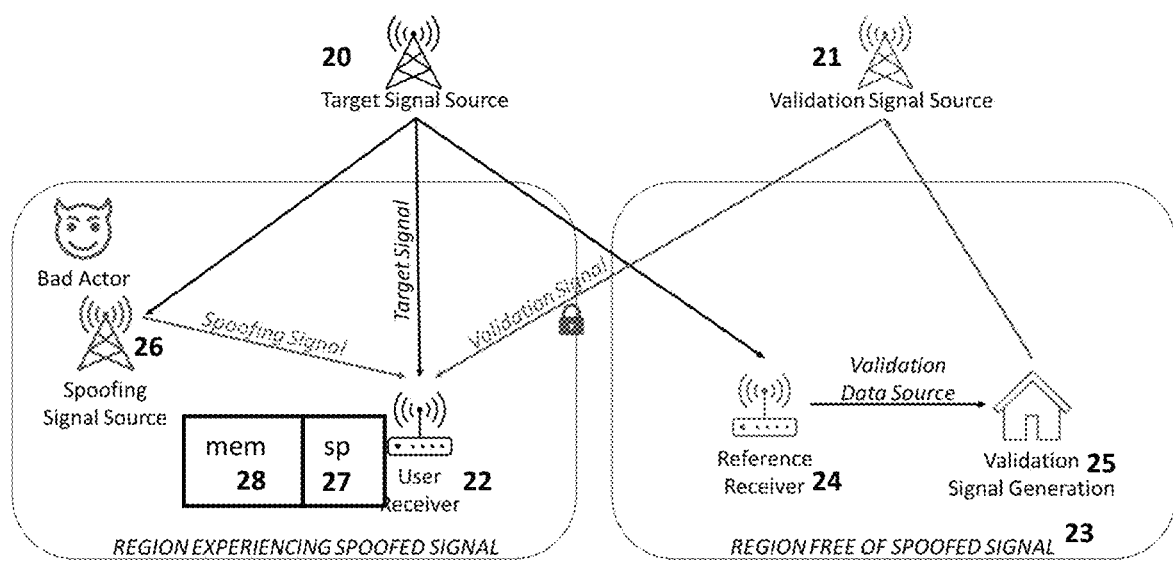
FIG. 2 illustrates one embodiment of an arrangement for wireless signal authentication using different communications networks.
Figure 3:
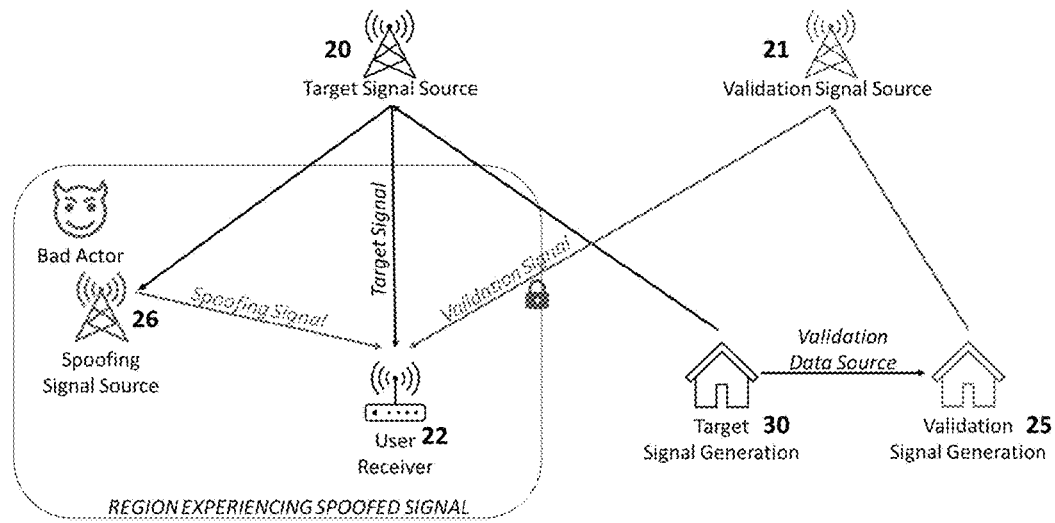
FIG. 3 illustrates an embodiment of another arrangement for wireless signal authentication using different communications networks.

A validation signal source emits the validation signal that the user receiver can use to verify the target signal. FIGS. 2 and 3 show two example systems or arrangements. The user receiver 22 receives the validation from the transmitter 21 and target signals from the transmitter 20 in acts 10 and 12. FIG. 2 shows the source of the validation signal being from a reference receiver 24, located in a region free of spoofing 23, receiving the target signal from the transmitter 20. The target signal is used by a signal processor 25 to generate the validation signal, which is provided to the transmitter 21. The wireless signal validation is based on the stand-alone receiver 22 using an independent, validated wireless data link providing a validation data source measured using the reference receiver 24.

FIG. 3 depicts the same system where the validation source is obtained directly from a trusted provider and/or the originating target signal generator 30 rather than through the reference receiver 24. The wireless signal validation is based on the stand-alone receiver 22 using an independent, validated wireless data link providing a validation data source provided directly from the target signal generator 30 (e.g., signal processor or transmitter that generates and distributes the target signal) to the signal processor 25 generating the validation signal.

In either approach of FIG. 2 or 3, the target signal is used as or to create a validation data source for content in the validation signal. The validation data source may be a primary signal for validation that would exist without the validation signal, an intentionally injected signal with good cross correlation properties, intentionally injected signal with unpredictable, cryptographically secure properties, meta data such as the target signal source location or time of emission, or contextual data, or another representation of the target signal and/or the transmitter 20. In one embodiment, the validation data source is a baseband replica of the target signal, either as digitally modulated symbols or baseband data samples. The validation data source may use an unknown original signal, such as measuring the target signal and estimating coding. Digitally modulated baseband symbols of the target signal may be estimated from a receiver with sufficient gain to successfully estimate the underlying target signal. The data is unknown as the actual symbol sequence and structure of the symbols is encrypted and/or cannot be determined a priori. For example, encrypted GPS P(Y) or M signals are obtained by the reference receiver 24 with a phased array of antenna elements with sufficient gain to estimate the modulated symbols (i.e., sufficient gain to achieve viable signal-to-noise ratio). As another example, OFDM signals are obtained by the reference receiver 23 near a cellular network base station with sufficient gain to estimate the modulated symbols. Baseband signals of the target signal may be estimated. In another embodiment, the reference receiver 24 does not have a high gain antenna and sends samples instead of estimated bits.

The validation data source is based on known data in other embodiments. The data (target signal) is provided directly, either before or after emission from the target signal source (transmitter 20). FIG. 3 shows this arrangement. The known target signal is to be used in generation of the validation signal. The known data may be digitally modulated baseband symbols obtained directly from the provider of the target signal or from a trusted source. For example, reference P(Y) or M code symbols are provided from a trusted source (e.g., a Government agency). As another example, a pseudorandom sequence injected into a frame of a telecommunications signal with the intent of providing data validation is used.

A bad actor may attempt to use a spoofing signal source (transmitter 26) to interfere with the user equipment (e.g., user receiver 22). A spoofing signal intended to provide incorrect information and be confused with the proper or authentic target signal may be transmitted.

The validation signal is used to distinguish the authentic target signal from any spoofing signal and/or to determine that spoofing is occurring. In the arrangements of FIGS. 2 and 3, the validation signal is provided from a source (i.e., transmitter 21) that is out-of-band from the source (i.e., transmitter 20) of the target signal. For "out-of-band," a different frequency band, spreading, format and/or other signaling is used for the validation signal than used for the target signal. To create out-of-band signaling or as an alternative to out-of-band, one transmitter 20 is part of a different constellation or communications network than the other transmitter 21. For example, the validation signal is provided from a LEO constellation while the target signal is provided from GPS, another GNSS, cellular, terrestrial media, radar, Wi-Fi, handheld radio communications, or another LEO system. The validation signal may be from one type of communications network, and the target signal from another. In alternative embodiments, both the target signal and the validation signal are transmitted to the receiver in the same communications network, such as both being LEO transmissions for the same LEO system (e.g., Iridium).

The validation signal includes information for the target signal and/or the transmitter 20. The information is used to authenticate or validate the target signal based on the content of the validation signal. The information may include any of the validation data source bits, such as a signal representation or an estimate measured from the target signal. The location, identification, time of transmission, or other parameters (e.g. contextual) or data elements (meta data) characterizing the target signal and/or the transmitter 20 may be used. The validation data source is derived from the original target signal (see FIG. 2) or is acquired directly (see FIG. 2 or 3). In one embodiment, the validation data source or content derived from the target signal is based on the target signal being received by the reference receiver 24 in a spoof-free region 23. The location and/or shielding may be used to establish the spoof-free region 23. Measurements or signal processing may be used to establish that the target signal is free of spoofing, thus forming the spoof-free region. Multiple reference receivers and/or phase array antennas may be used as it is difficult to spoof a signal in multiple locations. The validation signal is estimated using information from the multiple reference receivers 24. As a spoof-free region 23, the validation data source bits may be formed without errors from spoofing.

The estimate or known target signal information (validation data source) is used to form the validation signal by the signal processor 25. The validation signal is composed of the validation data source bits along with data for one or more authentication and/or validation techniques. Hashing, a digital signature, and/or message authentication code (MAC) is used with the validation data source content. For example, a MAC is calculated over the composite validation data source bits and a future link in a reverse hash chain, such that those bits can be validated when that future link in the hash chain is received. A digital signature may be used without the hash chain link (e.g., public key for the provider of the target signal stored on the receiver to validate the signal created with the private key). The digital signature may also be used with the hash chain link. The validation signal is generated as a composition of (a) information for the target signal and/or first source (i.e., data validation source bits) and (b) information for validation or authentication of the validation signal, such as the digital signal of the information and a hash chain link in a reverse hash chain. The information or content from the target signal or the validation data source bits are to be used to authenticate or validate the target signal as not being spoofed. The information for validation or authentication of the validation signal is to be used to validate or authenticate the validation signal as not being spoofed.

Figure 4:
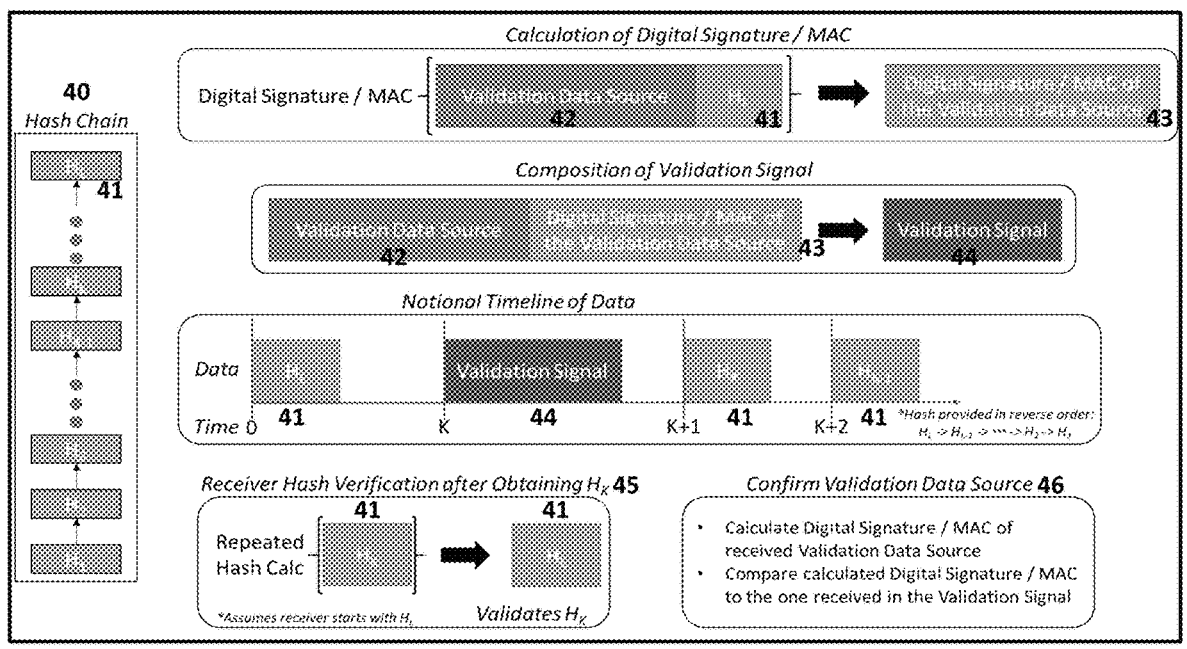
FIG. 4 illustrates example generation of a validation signal.

FIG. 4 shows one embodiment of the components of an example validation signal. The signal processor 25 generates the validation signal 44. The embodiment of FIG. 4 uses a reverse-hash validation as well as a digital signature or MAC. A digital signature and/or message authentication code (MAC) 43 is calculated over the composite validation data source bits 42 and a future link 41 in a reverse hash chain $H_1$-$H_L$ such that those bits can be validated when that future link in the hash chain is received (see the notional timeline of data in FIG. 4). Other hash links are used for transmission of other validation signals 44. The validation signal 44 is formed from a composite of the validation data source bits 42 and digital signature and/or MAC 44. The validation signal 44 is then broadcast to the user receiver 22, followed by a broadcast (e.g., another validation signal and/or a different signal) containing the hash chain link used to calculate the digital signature and/or MAC (see the receiver hash verification 45 after obtaining $H_k$). Other formats may be used.

The user receiver 22, upon receiving the validation signal and the hash link calculated from the hash verification 45, calculates the digital signature or MAC of the received validation data source 42. The calculated digital signature or MAC is compared to the digital signature or MAC 43 received in the validation signal. If there is a match, then the validation signal is authenticated or validated as not being from a spoofer.

In one embodiment, the hash links are from a hash chain. In at least one embodiment, a hash chain is generated for one or more satellites, such as one hash chain used for a plurality of satellites that may or may not be a part of a single constellation (e.g., hash chain for all satellites of a constellation). For LEO, a separate hash chain is generated for each LEO satellite or for each beam (e.g., 48 hash chains for the 48 beams (j)). For Iridium, a single hash chain may be generated for the satellites within the Iridium constellation or alternatively 3,168 hash chains are created for the 48 beams of the 66 LEO satellites. For GSO or MEO (e.g., GNSS satellites), one hash chain is generated for each satellite or for groups of satellites. For land-based transmitters, one or more hash chains are generated for each transmitters or alternatively one hash chain can be generated for at least two transmitters. The hash chain is of any length, such as hundreds of thousands or billions of sequential links. For example, the hash chain includes sufficient links to provide for sequential transmission over days, weeks, or months. In one embodiment, 20 years of hash chains for the system are generated and stored in the memory 13. The hash chain is generated using any hashing algorithm or cryptographic hash function. For example, MD5 or SHA-2 (e.g. SHA-2 consists of six hash functions with hash values that are 224, 256, 384 or 512 bits: SHA-224, SHA-256, SHA-384, SHA-512, SHA-512/224, SHA-512/256) hash is used. Any source of the original value to be hashed may be used.

In act 14 of FIG. 1, the signal processor 27 of the user equipment verifies that the validation signal is authentic or not spoofed. The digital signature, MAC, and/or reverse hash chain checks are used to verify the authenticity of the validation signal. This verification confirms that the content (e.g., the validation data source bits 42) of the validation signal may be trusted.

For the embodiment of the validation signal 44 of the example of FIG. 4, the stand-alone receiver verifies that the received validation signal is trusted via digital signature or MAC and reverse hash chain check. After receiving the validation signal and corresponding hash-chain link in a later signal, the signal processor 27 of the receiver 22 verifies.

An element of the hash chain can be factory initialized, updated from a secure internet site during a time when the receiver has an internet connection, manually loaded, or initialized with over the air data when the receiver is in an environment known to be free of spoofing. The signal processor 27 or another processor determines and/or causes storage in a memory of one or more digital signatures, hash chain links, validation data sources, and/or validation signals. The digital signature or MAC is to authenticate the data content of a message or messages. The digital signature was generated from data previously transmitted and/or to be transmitted in the messages. By generating another digital signature in the same way from the data 42 as received in the validation signal 44, the digital signatures may be compared. If the same key is used and the key is secure, then matching digital signatures indicates that the data has not been changed. The data is authenticated.

Since the earlier generated and later transmitted hash chain link is hard to predict, this hash chain link may be used as the key. In the secure environment of the signal processor 25, the hash links are available for use as keys. At the user receiver 22, the key (next transmitted hash chain link) is received in a subsequent message. Once that subsequent message is received, the key is available for generating the digital signature. The authentication or validation of the data content cannot be checked until the next epoch (i.e., until the next hash chain link is received). Key management is provided as part of the source validation rather than having to manage decryption keys. The user receiver 22 may validate or authenticate the data content without communication at the time with a separate server. The user receiver 22 validates or authenticates without bidirectional communication, only needing to receive the target signal and the validation signal.

For validation, the user receiver 22 knows the hash algorithm used to create the chain and the last hash chain link. The hash links of the chain are added to validation signals from the transmitter 21 in reverse order. Given a link and the index of the link (i.e., link number), the signal processor of the user equipment applies the hash algorithm k times to confirm that the result is the expected link or applies at least one time to confirm that the result is the expected hash (e.g., from the previous message).

Any spoofer would require a very large amount of processing power and/or time to predict the future hash chain link, so that hash chain link cannot be predicted to then spoof the next message. Since the hash chain links are transmitted in reverse order, the received hash chain link may be used to validate the source of the signal and any spoofer would be unlikely able to use the information to spoof subsequent messages.

In one embodiment, the Timed Efficient Stream Loss-tolerant Algorithm (TESLA) is used for validation. Other approaches using the hash chain link may be used. Other chains created with an algorithm other than hashing may be used. In addition to the previous hash link, the input to the hash may include the index k, a cryptographic "salt," or another cryptographic feature to make the hash chain more difficult to attack. Any data process generating a directional sequence of values may be used for generating the validation data as links to be transmitted in a reverse order.

In act 16 of FIG. 1, the signal processor 27 of the user equipment validates the target signal. Once the validation signal 44 is verified as authentic, the validation signal 44 is used to validate the target signal. Act 16 may be performed prior to act 14 where verification in act 14 confirms the validation in act 16 is proper.

The validation signal 44 includes the validation data source 42 of content associated with or corresponding to the target signal. This authentic content of the validation signal 44 is used to validate the target signal as not being spoofed.

To validate the target signal, the information (validation data source 42) from the verified validation signal is compared to the target signal. The comparison may be direct, such as the same codes, time, location, and/or other content. The comparison may be a comparison or correlation, such as identifying similar code or align phases of peak correlation. Other comparison may be used. Upon positive validation of the received validation data source 42, the receiver 22 utilizes the target signal stored in memory along with validation data source 42 to validate the target signal.

Figure 5:
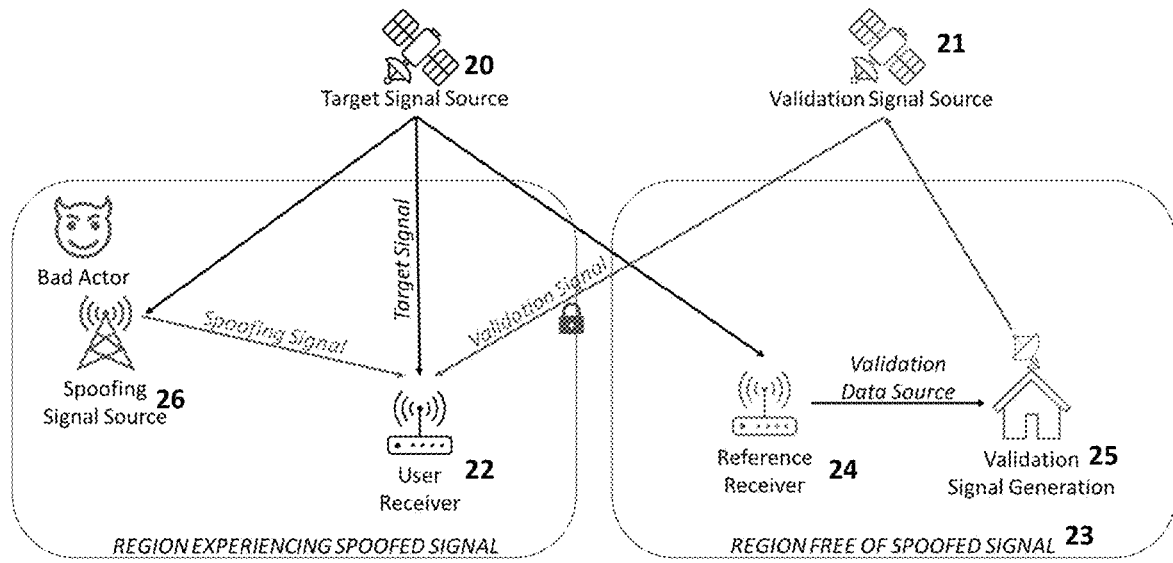
FIG. 5 illustrates an embodiment of a satellite-based arrangement for wireless signal authentication using different communications networks.

FIGS. 5-9 show different embodiments for validation using a second source, such as a different communications network, for the validation signal. FIG. 5 shows a target signal source 20 and a validation signal source 21 each coming from a different satellite. The different satellites may be from different satellite communication networks or constellations, providing multi-constellation validation. The different satellites may be from different satellites in a same constellation but different orbits (e.g., MEO and LEO). The different satellites may be from different satellites in a same constellation in the same orbit (e.g., both LEO). In one embodiment, the constellation or same operational entity performs self-validation. For example, Iridium uses a pseudo-random, a priori unknown signal to spread a signal to be below the noise floor of a receiver as a new target signal component to complement the later validation signal also sent by Iridium. The unknown signal may use a code spread based on a future hash. The user receiver figures out what the spreading code was in a previous signal (decode or correlate) based on information in the validation signal or uses comparison to validate.

In FIG. 5, the target signal source 20 is a GNSS satellite of a GNSS communications network or constellation, such as a GPS satellite or a Galileo public regulated service (PRS) satellite. As a result, the target signal may include C/A code or other known code, which may be a known code spread below the noise floor of the user or reference receivers 22, 24. Initially unknown code or modulation (e.g., GPS Y or M code) below the noise floor may also be included in the target signal, such as where the user equipment is not intended for military operation. The GPS example with Y or M code is used herein but other initially unknown modulation may be used. The Y or M code may be unknown to non-military equipment at the time of broadcast and have greater bandwidth than the C/A code (C/A code chipping rate of 1.023 MHz verse Y code chipping rate of 10.23 MHz). Carrier-to-noise ratio (CNR) normalized to 1 Hz bandwidth (i.e., CNR density ratio) or SNR of the coding is below the noise floor of the receiver so that the signal cannot be fully received without knowing the code in advance. For example, the signal amplitude is smaller than noise (1-sigma of noise). As another example, C/No for a GPS satellite is 50, and the SNR of an individual Y code chip is about 0.1. The embodiment of FIG. 5 allows for validation using an unknown target signal, which signal is encryption in the GPS system (e.g., Y or M code).

The reference receiver 24, with an antenna providing sufficient gain to correctly determine a significant majority of GPS Y or M code bits, collects data and estimates the unknown encrypted Y or M code bits (e.g., estimates 10000 bits) to be used as the validation data source 42. Low pass filtering at something close to the Y or M code chipping rate or other processing may be used to estimate the code bits. The estimate of the unknown Y or M code bits from the GPS satellite are used as the target signal information included in the validation signal 44. Other unknown coding may be estimated. A validation signal 44 is then generated by the signal processor 25 and broadcast by the validation signal source 21 for a randomly selected satellite above the horizon in the region of the broadcast.

The user receiver 22 stores a buffer of GPS samples and compares (e.g., correlates) those samples against the validation data source bits 42 received in the validation signal 44. The comparison may be a correlation, alignment, amplitude difference, or any other measure representing a difference between two signals or information. The comparison may yield a match, indicating validation or authentication. For example, a correlation peak for the estimate of the Y or M code bits with the target signal may have a same phase as a C/A code peak of the target signal. The target signal may include the C/A code and Y/M code. If the signal in the buffer is authentic, there will be a correlation peak with the same code or align phase as the C/A code peak. The comparison is between stored samples containing the target signal (M or Y code) at a time interval t=T0 to t=T1 and an estimate of the target signal over the same interval T0 to T1. Upon validation or authentication of the validation signal (e.g., digital signature match or reverse hash chain link and MAC, the receiver 22 has confidence that the received validation signal was not spoofed. The phase from correlation of estimated encrypted signals matching the C/A code validates the target signal as not being spoofed.

In other embodiments, the reference receiver estimates W code instead of using Y code or estimates Y code. Y code is the product of P code and W code. W code is estimated by stripping off P code and the carrier and averaging over a W code bit or an approximation to that.

In general, the target signal has coding below the noise floor (e.g., Y (or W) or M code). The validation signal is formed to have estimates of the code chips (e.g., Y/M code chips). The estimation is performed as the actual code is not known. The estimate is then sent over a traditional communication channel (e.g., LEO satellite communications) with the estimated code (a) above the noise floor or (b) below the noise floor and spread with a known code such that the estimate may be despread to be above the noise. Where GPS or other system with restricted communications provides the target signal, the estimation is provided using a different constellation. The target and validation may be provided in the same constellation or communications system in other embodiments, such as a future signal spread below the noise floor as the target signal and data to provide the spreading sequence in a validation signal in the same constellation. In the embodiment of FIG. 5, GPS Y or M code may be validated by providing (via Iridium for example) the estimated Y or M code bits to the user receiver 22 after the fact. In that case the "target signal" is the GPS broadcast and the "validation signal" is the estimated M or Y code bits sent through LEO (e.g., Iridium) with MAC or digital signature for the estimated bits. The target signal would therefore include a signal spread below the noise floor and the validation signal would be the bits provided above the noise floor after the fact. In other embodiments, the same satellite sends the spread signal below the noise followed later by a validated version of information that would allow the original spreading code to be replicated. Other sources than satellites may be used in this arrangement.

If the reference receiver(s) has high enough gain, the GNSS receiver can increase the signal power to be above the noise floor or at least closer to the noise floor. Not every bit of the M or Y code needs to be correct in the estimate for the system to work. If the signal and noise are comparable or worse (signal below the noise floor), the estimate can still be made and used. For embodiments with reference receivers, no prior knowledge of the "below the noise floor" spreading codes are needed. For the case of Y code, the knowledge about Y code being a product of a known P code and unknown W code can be leveraged to reduce the required gain for a certain level of unknown code estimate accuracy.

Below is pseudo code representing another embodiment not requiring the reference receiver 24. An apriori unknown modulation, such as a spreading code, spreads a signal below the noise floor, and, at a later time, information is provided the enables the receiver to replicate some or all of the previously unknown code. That information is validated (e.g., via MAC, digital signature, etc.) to have come from the intended source. From the perspective of the user receiver 22, a first signal (e.g., the target signal) is wirelessly received. The first signal has a first component spread below a level of noise with a spreading code or modulation initially unknown to the receiver. A spreading code example is used herein but other initially unknown modulation may be used. The spreading code is based on a one-way function with an input to the one-way function unknown to the receiver when receiving the first signal. Then, the user receiver 22 wirelessly receives a second signal (e.g., a validation or subsequent target signal), which includes information about the first component, such as the input used to create the spreading code or other information to be used to estimate the first component. The spreading code is replicated, at least in part (e.g., 75%, 90%, or more), from the input received in the second signal. For example, the same one-way function is performed on the input. The one-way function may be a digital signature or hash chain. The input may be a reverse hash chain link received in the validation signal in a recoverable way, such as above the noise or below the noise floor with a known spreading code. The target signal source is validated based a reverse hash chain link and MAC, digital signature or other technique. The replicated spreading code is used to validate the content of the target signal.

In this embodiment, the signal is spread below the noise floor. The pseudo-random code cannot be predicted with information available at the time it is received. No information is provided that can be used to figure out data intended to be secret at the time it is received, even if a high gain antenna is used to see the signal with a high signal-to-noise ratio. Yet, the information may be later reproduced. The information provided later to reproduce the spreading code is validated via a reverse hash chain, digital signature, MAC, or other technique to have come from the intended source. When possible, a relatively small number of bits can provide that information (for the example embodiment below, no additional bits are required because we send the chain links anyway).

In one example, the one way functions are used with an input that is intended to be secret until later. Because it is a one way function, the secret remains secret. Because the chain is different than the chain being used for validation (a known sequence is appended to the link value before creating the first link in the second chain), it cannot be predicted. Because the second chain is derived from a link in the first chain, no additional data needs to be sent. Because the first chain is itself validated by propagating back to a trusted value, its source is validated.

In this example, one satellite broadcasts a spread signal below the noise and a higher power signal with a hash chain, which higher power signal can be used to replicate the spreading with some delay. In this embodiment, the reference receiver is not needed or is a processor for receiving, loading, or generating the known wide band signal below the noise and spreading the signal with a code that is a function of the reverse hash chain. For example, the reference receiver 24 is not used or provided. Instead, the sender of the second signal (e.g., validation signal generator 25) has knowledge of the future value of the hash chain links (either the same entity or a partner providing advance information). A MAC plus the reverse hash chain link or tag is used for the second signal. The user receiver 22 receives the wide band signal, which includes code spread based on the hash chain link. The user receiver also receives the validation signal from the same or different constellations and/or satellites. The validation signal includes the hash chain link. The user receiver 22 then verifies the validation signal source based on the MAC and hash chain link and replicates the spreading using the hash chain link from the validation signal. The user receiver validates or authenticates the target signal based on the replicated spreading. The spreading is compared to the target signal, such as finding a magnitude of peak correlation, detecting a number of peaks (multiple peaks may indicate spoofing), or a dot product of aligned signals.

The pseudo code below gives another example. In the pseudo code, the reverse hash chain link used for spreading has a reverse order of bits. In other examples, the order of the bits is not reversed.

```
% Say that the time step for a reverse has chain is 100 msec
% and that the chain value at index N+1 into that chain is
% 711f2d8b0ea7749f4c20882de13a6bdd
% At the time corresponding to index N into that chain (100 msec earlier)
% a spreading pattern for 100 msec can be calculated by appending a known string to that sequence. Eg:
% 711f2d8b0ea7749f4c20882de13a6bdd01234
% and then using that as the root of a new hash chain. If the chipping rate of
% the spreading pattern is 5 MHz, the number of values in the 256 bit hash chain would need to be
NV=ceil(0.1*5e6/256) % number of second hash chain values per 100 msec interval
NC=0.1*5e6; % number of chips
% Initialize a pseudorandom sequence to all zeros
prs=zeros(NC,1);
% find second hash chain values and populate prs
chainvalue=hash('sha256',
    '711f2d8b0ea7749f4c20882de13a6bdd01234');
```

```
        chainind=NC;
        for ii=1:NV
           chainvalue=hash('sha256', chainvalue);
           for jj=1:64
              nb=dec2bin(hex2dec(chainvalue(jj)),4);
              for kk=1:4
                 if (chainind < 1)
                    break;
                 end
                 % set elements of pseudorandom sequence to +/- 1
                 prs(chainind)=bin2dec(nb(kk))*2-1;
                 chainind=chainind-1;
              end
           end
        end
```

% simulate receiving the pseudorandom sequence under the noise floor in a receiver
% for illustrative simplicity, one sample per pseudorandom sequence bit is used here.
% multiple samples per bit and/or complex samples may be used in a receiver rxsignal=prs/10+randn(NC,1); % noise sigma 10× the amplitude of the signal
% after buffering the samples received during the Nth 100 msec interval
% the N+1 chain value is received. The same algorithm used by the transmitter
% is used to generate a replica of the pseudorandom sequence (not repeated here for brevity)
% Note, if the N+1 chain value isn't successfully received at the receiver, a later
% successfully received chain value can be propagated to find the N+1 chain value.
%  Eg: chainvalueNplus1=hash('sha256',chainvalueNplus2);
% The buffered samples are compared with the replicated pseudorandom sequence
% one comparison technique is to find a correlation between them using convolution
corr=conv(rxsignal,prs(end:-1:1));
% or with frequency domain correlation
corr2=abs(ifft(fft(rxsignal).*conj(fft(prs))));
% The magnitude of the peak correlation can be checked with a threshold to gain confidence that the real signal was received
confidence_metric=max(corr2)/NC;
% Note, instead of looking only at the max, other values in the correlation could be inspected for signs of spoofing (e.g., multiple peaks)
% If an expected signal alignment is already known, the correlation could be replaced with a dot product with aligned signals.
confidence_metric=abs(dot(rxsignal,prs)/NC);
% the threshold could be a function of the standard deviation of the samples and the expected signal to noise ratio;
expsnr=0.1;
threshold=std(rxsignal)*expsnr/2;
if (confidence_metric>threshold)
   have_confidence=true;
else
   have_confidence=false;
end In one embodiment, the validation signal 44 (unknown (estimated) validation data source bits 42 and digital signature/MAC 43) and hash chain link 41 are broadcast from a satellite of the Iridium LEO satellite constellation as the transmitter 21.

Figure 10:
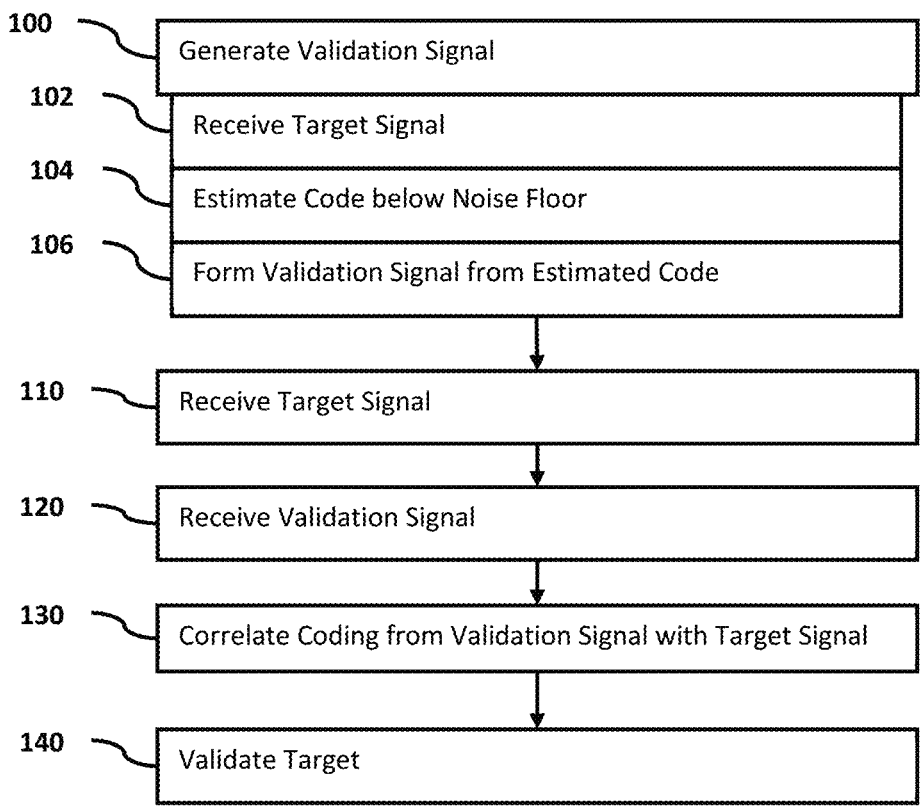
FIG. 10 is a flow chart diagram of one embodiment of a method for wireless signal validation based on correlation of coding from below a noise floor.

In another embodiment, a signal like M/Y code (unknown, pseudorandom, and well below the noise floor) is broadcast from a source other than GPS and the same technique is used, with the data being broadcast over the same or a different source. For example, a LEO satellite (e.g., Iridium satellite) is the transmitter 20 of the target signal, broadcasting a highly spread pseudorandom sequence spread to be at a much lower power density than the primary satellite (e.g., Iridium) broadcasts. The coding is estimated and used in validation of the target signal from the satellite transmitter 20. In other embodiments, the coding is known so known coding rather than an estimate is used. The transmitter 21 is the same transmitter, a transmitter of a different LEO satellite, or a transmitter for an out-of-band or different communications network. FIG. 10 describes an embodiment using this coding estimation where one constellation or network is used to "self" validate instead of the different communications networks of FIGS. 2-3 and 5-8.

Satellite or terrestrial transmitters for vehicle, rail, marine or other applications may be the source of the target signal. In yet another embodiment, the same technique could be used for terrestrial transmitters like those of NextNav or from UAVs or balloons or for semi-autonomous or autonomous vehicles. In such embodiments, where the source transmitter 20 of the target signal is not a current GPS signal, the spreading could be accomplished such that a relatively small number of bits could create a large number of pseudorandom codes for spreading the signal. For example, a future link in the reverse hash chain could be appended to a known string and hashed with a one-way hash to create the root of a second reverse hash chain. Many links in that second reverse hash chain could be appended together to become the spreading sequence. For example, 3970 links of a 256-bit hash chain (dropping the excess bits in one link) could be broadcast at a 10 MHz chipping rate during for example, a 100 msec frame or alternatively the number of links could be adjusted to support that of an Iridium or other system frame interval. This approach allows self-validation with one communications network. In other embodiments, the target signal with the coding is received by a reference receiver 24 or directly provided for generation of the validation signal to be wirelessly communicated through a different communications network to the user receiver 22.

Figure 6:
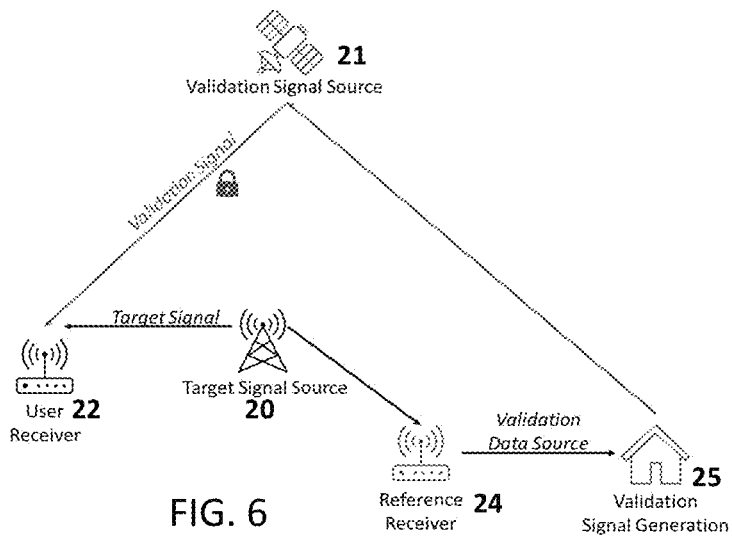
FIG. 6 illustrates an embodiment of satellite-based validation of terrestrial signals.

FIG. 6 shows an embodiment using signals of opportunity (SOOP). A terrestrial transmitter 20 transmits the target signal. The target signal source is a fixed, terrestrial based transmitter such as a TV network or AM/FM radio station. A radar transmitter may be used. Signals such as this are often referred to as SOOP. In one example, the target signal is for geolocation. SOOP may be used for geolocation while also providing validation for authenticating measurements.

The reference receiver 24 receives the target signal and derives a validation data source from the target signal. For example, the validation signal is formed from a baseband or intermediate frequency representation of the target signal such that the representation can be used as a reference sequence in a correlation process to determine time of arrival. The validation data source may also contain the location of the target signal source (i.e., transmitter 20) as well as features of the transmitter such as position or time of transmission. The validation signal is then generated and broadcast. The receiver 22 stores a buffer of the target signal samples and correlates those samples against the bits received in the validation signal to derive a time of arrival measurement where a strong correlation indicates this measurement can be used for geolocation or passive radar applications. Upon receiving the future hash chain link and validating the MAC, the receiver 22 has confidence that the received signal and corresponding range measurement are valid.

The stand-alone receiver 22 is provided with validated sequences for cross-correlation of SOOP. In another embodiment, a reverse approach may be used. The target signal source 20 could be measured by a 'trusted source' and/or at a trusted location and then sent out to a bunch of receiver's 22 in the field. The receivers 22 could all perform ranging measurements. Knowing their own location, the source of the target signal is geolocated.

Figure 7:
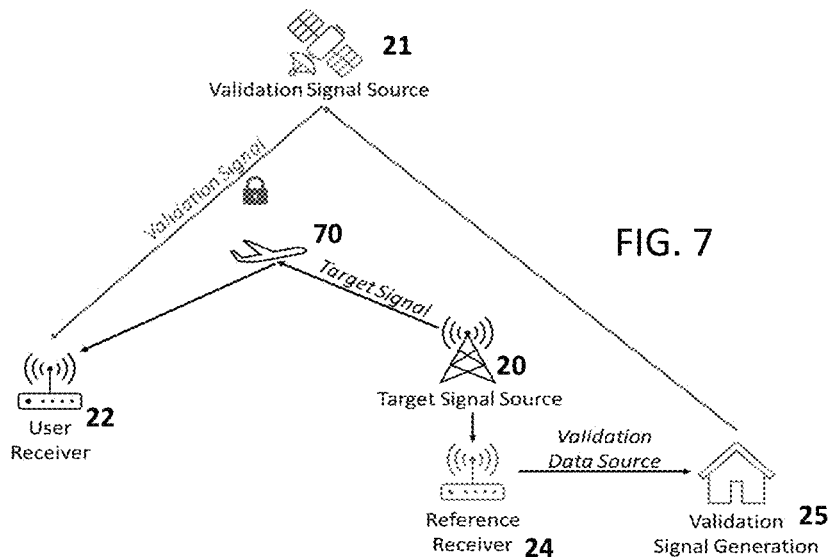
FIG. 7 illustrates another embodiment of satellite-based validation of terrestrial signals.

FIG. 7 shows an embodiment for validation of an unknown target signal for passive radar. The target signal is reflected from an object 70 and received by the user receiver 22. The reference receiver 24 also receives the target signal, which may or may not have been reflected from the object 70. The target signal is validated using a validation signal. This arrangement simultaneously enables the use of SOOP for geolocation while providing a validation methodology for authenticating measurements. In addition to the validation capability, this is particularly useful when direct line-of-sight measurements are unavailable at the user receiver 22 to generate a reference sequence in a passive radar system.

Figure 8:
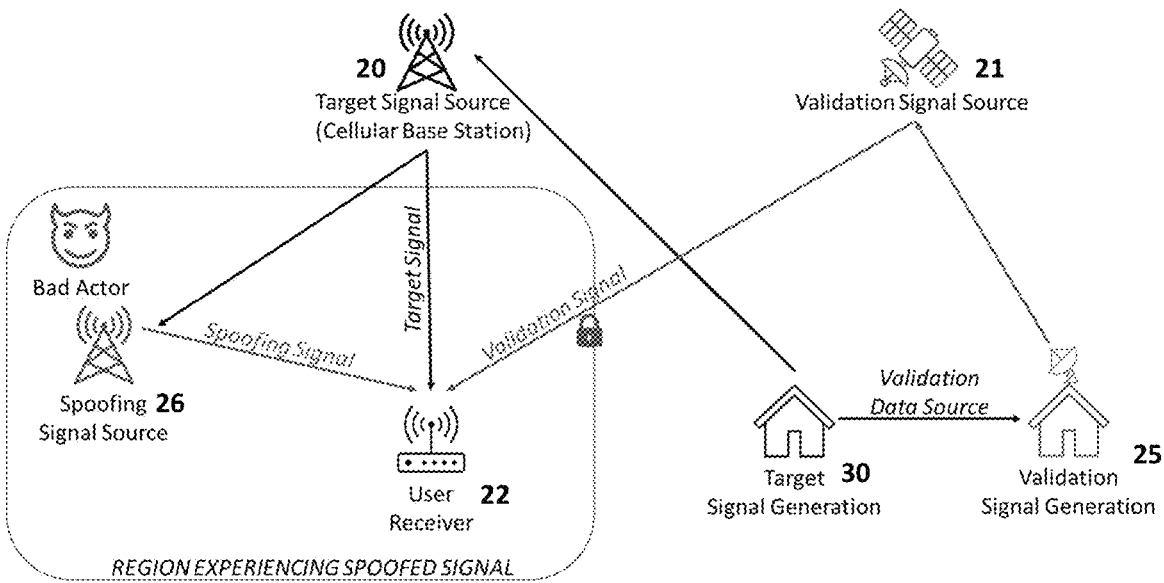
FIG. 8 illustrates an embodiment of satellite-based validation of cellular signals.

FIG. 8 shows an embodiment using a cellular base station as the transmitter 20 of the target signal. The reference receiver is not provided and the signal processor 25 obtains the validation data source of the target signal directly from the operator of the base station (from the target signal generator 30). Effectively, this embodiment involves cooperation between the parties responsible for target signal generation and validation signal generation. The validation data source may be constructed in such a way to directly provide the desired comparison methodology, such as an unpredictable, pseudorandom sequence with good cross correlation properties for comparing as discussed above for FIG. 5. As another example, parameters of the cellular base station and/or characteristics of the target signal are provided directly and included in the validation signal. Information directly provided by the signal generator 30 or another source is included in the validation signal and used in comparison to authenticate the target signal.

Figure 9:
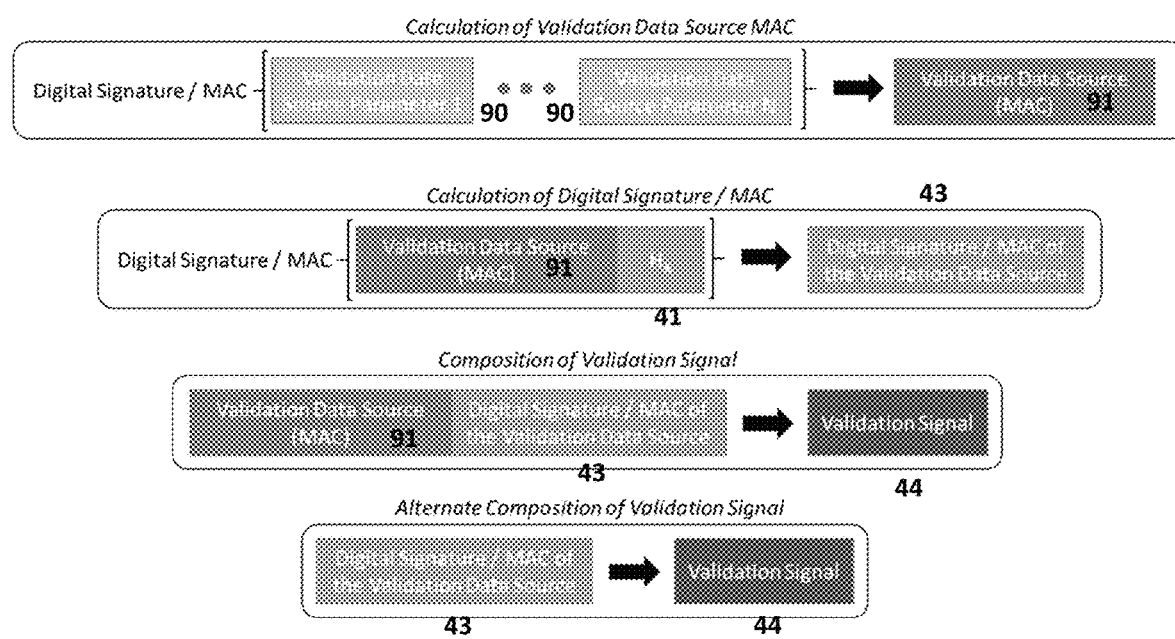
FIG. 9 illustrates an example generation of another validation signal.

FIG. 9 shows another embodiment of the format or generation of the validation signal 44. This approach uses a MAC of MAC. A digital signature of a digital signature may be used in other embodiments.

The validation data source 90 is constructed using a digital signature/MAC calculated over a predetermined set of data relevant to the target signal (i.e. some meta data parameters, timing information, clock properties, ephemeris, etc.). This validation data source 90 is used to generate a validation data source MAC 91. The validation data source MAC 91 is then used as the validation data source, combined with a future link 41 in the hash chain. A MAC 43 of this MAC 91 plus hash link 41 is calculated and appended to the MAC 91 to form the validation signal 44. The reference receiver 22 captures and stores the required data to calculate the validation data source MAC 91. Alternatively, the data is directly provided.

Upon receipt of the validation signal, the user receiver 22 compares the received validation data source MAC 91 and a calculated validation data source MAC as a first stage of verification. Upon receiving the future hash chain link and validating the MAC 43, the verified MAC 91 would be hashed with the reverse hash chain link 41 to validate the data utilized in calculating the validation data source MAC 91. This embodiment may be used to validate arbitrary data and signal features observed at a user receiver from any known target signal. This may be a low bandwidth way to validate other GNSS data.

In another embodiment of this MAC of MAC approach, the validation data source could instead be constructed using a digital signature or MAC 91 calculated over GPS or other GNSS subframe data extracted by the reference receiver 22. GPS will be used as an example, but sub-frames for Galileo Public Regulated Service (PRS) or others may be used. The GPS subframe data is used to generate the validation data source MAC 91. The validation data source MAC 91 is then used as the validation data source, combined with a future link 41 in the hash chain, and a MAC 43 of this MAC 91 is calculated to form the validation signal 44. The reference receiver 24 captures and stores the required GPS subframe data to calculate the validation data source MAC 91. Upon receipt of the validation signal 44, the user receiver 22 compares the received validation data source MAC 91 and calculated validation data source MAC as a first stage of verification. Upon receiving the future hash chain link and validating the MAC 43, the verified MAC 43 would be hashed with the reverse hash chain link to validate the GPS subframe data 90 utilized in calculating the validation data source MAC 91.

In an alternative shown in FIG. 9, the validation signal does not include the MAC 91. Instead, the digital signature or MAC 43 of the validation data source is transmitted as the validation signal 44. The MAC 43 of the original MAC 91 and hash Link 41 is sent without the MAC 91 also being sent.

Combinations of any of the signal sources may be used as the target and validation signal sources. The validation data sources may be any combination of know and/or unknown baseband or intermediate frequency signal representation (i.e. raw samples and/or modulation symbol estimates). The validation data source may be a "MAC of MAC" over a set of target signal data and/or signal parameters. The target signal may further be the 'normally' operated waveform or a specifically injected waveform for validation purposes. Specific injection may facilitate timely transmission of validation data to a receiver.

Various applications are discussed above. Other possible applications could include for use with a compromised satellite constellation or ground infrastructure. One example would be not just validation but orbit or clock data for another constellation (i.e., use what is observed from base stations). The validation may be used to hot start one constellation with another (like a SOOP). The validation signal includes ephemeris and/or clock information to be used for hot starting. In another application, multi-factor and/or multi-source authentication is provided for satellites (see FIG. 5). Two separate reverse hash chains may be used so that validation is provided both ways between the constellations. In another application, the content for the validation data source is position, navigation, timing (PNT) data.

The validation may be used regularly or periodically. In another embodiment, the validation is provided in response to a trigger, such as an indication that a constellation may be compromised or thought to be compromised. More frequent or constant use may be computationally intensive.

Where a communications network is thought to be compromised, the other communications network for validation may be used as a replacement. For example, where no clock or orbit may be determined, then the system may be compromised. The positioning is switched to another constellation, such as the one used for validation. Alternatively, the switch is to include orbit and/or clock information in the validation signal, allowing the receiver to continue operating.

Files may be sent. The validation channel may be a relatively low band width channel, but the relatively high bandwidth target channel may be less secure. By relying on the validation or security of the low bandwidth channel, the high band width channel may be made more secure. By sending data (e.g. Iridium, Starlink, Global, and OneWeb ephemeris and/or clock) over the validation constellation, other operations may be provided, such as validating WAAS or EGNOS corrections.

The validation using the different wireless communications may be used even where the user receiver 22 has a wired connection or communications access to an authentication server. The wireless validation may be provided as a back-up should the connection to the server fail and/or as a second source of authentication.

FIGS. 2-3 and 5-8 show example embodiments of systems for wireless validation. These embodiments provide two-source authentication, such as providing out-of-band validation signals for the target signals and/or providing target signals from one communications network and validation signals from another communications network. By providing security (e.g., digital signature, MAC, and/or hash) with content of or about the target signal in the validation signal, both the validation signal and target signal may be validated and/or verified as authentic. The systems implement the method of FIG. 1 or another method.

The systems include two transmitters 20, 21, the user equipment (e.g., user receiver 22, signal processor 27, and memory 28), and a source of the validation signal (e.g., reference receiver 24 or generator 30 of the target signal and the signal processor 25 to generate the validation signal from the target signal information). Additional, different, or fewer components may be provided. For example, the bad actor is not there or is not attempting to spoof, so the spoofing transmitter 26 is not there. As another example, a communication network, such as the Internet or a secure connection, is provided between the generator 30 and the signal processor 25. In yet other examples, additional objects 70, communications networks, transmitters, user equipment, and/or other devices are provided.

The user receiver 22 and/or the reference receiver 24 may include an oscillator, phased-lock-loop circuit, field programmable gate array, application specific integrated circuit, multi-thread processor, signal processor, general processor, graphics processing unit, correlation processor, digital circuit, analog circuit, combinations thereof, or other device for receiving wireless signals. The receivers 22, 24 may include processors, such as including the signal processor 27, for correlating or performing other operations on the received signals. The receivers 22, 24 connect with one or more antennas each for receiving wireless signals.

The user receiver 22 is configured to receive wireless signals from multiple communications networks, such as one network being GNSS, GPS, cellular, radar, or terrestrial broadcast and the other network being a LEO system. Other combinations of networks for the two networks may be used. The receiver 22 may be configured to receive from three or more networks. Different antennas, frequencies of operation, and/or format are used to receive the signals from the different networks.

The reference receiver 24 may include higher gain, different, or the same type of antennas as the user receiver 22. The reference receiver 24 is configured to receive the target signals or data characterizing the target signals or the transmitter 20.

The generator 30 is a signal processor, memory, digital-to-analog converter, and/or other source of information representing, about, or being the target signal. The generator 30 is part of the communications network with the transmitter 20 for broadcasting the target signal. Alternatively, the generator 30 receives the information from the communications network.

The signal processor 25 is part of the communications network for transmitting the validation signal. Alternatively, the signal processor 25 is controlled by a third-party providing information used in or providing the validation signal to the communications network. The signal processor 25 is configured to generate the validation signal, such as formatting the validation signal (see FIGS. 4 and 9 for examples). In one embodiment, the signal processor 25 is configured to generate a digital signature or message authentication code from the target wireless signal or the data and generate a validation signal from the digital signature or message authentication code and a hash chain link.

The signal processor 27 is part of the user equipment, such as being a processor for operating on received signals, such as the received target signal and the received validation signal. The signal processor 27 may additionally use the target signal, such as for determining location, time, or other navigation functions.

The signal processors 27, 25 are processors of the receivers 22, 24, such as used for correlation for PNT. Alternatively, the signal processors 27, 25 are separate devices from the respective receivers 22, 24 for extracting data from a received message and/or for validation. For example, the signal processor 27 is a separate field programmable gate array, application specific integrated circuit, multi-thread processor, signal processor, general processor, graphics processing unit, correlation processor, digital circuit, analog circuit, combinations thereof, or other device for validation and/or authentication from received data or messages.

The memory 28 is a cache, random access memory, hard drive, flash drive, optical drive, combinations thereof, or other memory for storing received signals, sequences for correlation, extracted data, a hash link root, hash link, and/or other information used in validation. The memory 28 is part of or used by the receiver 22. The hash link root may be added to the memory in a secure environment and/or in a secure way. The memory 28 may be non-transitory computer readable storage medium and store instructions executable by the signal processor 27. The signal processor 27 is configured by software, hardware, and/or firmware to validate and/or verify.

The signal processor 27 is configured to validate the target wireless signal from content of the validation wireless signal. The content may be the target signal, a representation of the target signal, data characterizing the target signal, and/or data characterizing the network providing the target signal (e.g., transmitter 20 information).

The signal processor 27 is configured to validate the validation wireless signal with a reverse hash, digital signature, and/or message authentication code. A MAC of MAC format (see FIG. 9) may be used. A digital signature or MAC with a hash link of a reverse hash chain (see FIG. 4) may be used. Other formats may be used.

The validation signal includes information for the target signal. The signal processor 27 is configured to validate the target wireless signal with the content from the validation signal based on the validation wireless signal being validated. Where the validation signal is validated or verified based on the hash, digital signature, and/or MAC, then the content related to the target signal of the validation signal is authentic. Where this content matches the content of the target signal, then the target signal is authenticated. The signal processor 27 is configured to extract the content, such as by using a hash chain link of a reverse hash, to then validate the target signal.

The transmitters 20, 21 are wireless signal transmitters. The transmitters 20, 21 have a same or different structure. The transmitters 20, 21 include a reference oscillator, voltage-controlled oscillators, a clock generator, a high rate digital code generator, mixers, filters, a timer and switch, an antenna, a microprocessor and/or a summer. Additional, different or fewer components may be provided.

The transmitters 20, 21 may be satellites, cellular base stations, other terrestrial transmitters, radar emitters, Wi-Fi transceivers, handheld radios, balloon-mounted transmitters, aircraft mounted transmitters, or other transmitters. In one embodiment, the transmitters 20 and 21 are satellites, such as LEO, geosynchronous (GSO), Medium Earth Orbit (MEO), other satellites or combinations thereof. For example, the transmitter 20 is a GNSS satellite (e.g., GPS), and the transmitter 21 is a LEO satellite (e.g., Iridium satellites, SpaceX satellites, and/or OneWeb satellites). As another example, the transmitter 20 and/or the transmitter 21 are small sats, or nanosats such as cubesats, or SpaceBEEs. Different satellite constellations are used.

The transmitters 20, 21 broadcast or directionally transmit the target and validation signals. The transmitters 20, 21 are configured by software, firmware, and/or hardware to transmit the signals to the receivers 22, 24. Other signals may be transmitted, such as transmitting validation signals with a repetition frequency of tens of seconds, few minutes, hours, or days and transmitting target signals continuously or every few seconds.

FIG. 10 is a flow chart diagram of one embodiment of a method for validation of wireless signals. Two signals are used to validate. The signals are from different or the same communications network and/or transmitter. By using information in the target signal below a noise floor of the user receiver 22, the validation signal does not need to be from a different constellation. In FIG. 10, acts 102, 104, and 106 are part of act 100 but may be separate in other embodiments. By following the approach described above with respect to FIG. 5, a single communications network may provide validation or verification of authenticity.

The method is implemented by a communications network, such as a LEO or GNSS system. FIG. 5 shows an example system where the two transmitters 20, 21 may be in the same constellation (or same communications network) or different constellations (or different communications networks). In one embodiment, a satellite constellation may employ multiple orbital configurations so that one transmitter is in one orbit (orbital range such as MEO) and another transmitter is in another orbit (orbital range such as LEO). The two transmitters 20, 21 may be a single transmitter. Other arrangements may be used.

The acts are performed in the order shown (e.g., top to bottom or numerical) or a different order. For example, act 140 is performed after or as part of act 160.

Additional, different, or fewer acts may be provided. For example, acts 100-106 are not performed. As another example, acts for use of the target signal once authenticated, such as for navigation, are provided.

In act 100, a validation signal is generated. Validation signals may be generated continuously, such as for use with all target signals. Validation signals may be generated periodically or upon a trigger, such as every 30 seconds or few minutes upon triggering based on concern over spoofing.

In act 102, a reference receiver receives the target signal. The target signal includes coding spread below the noise floor of at least the user receiver. The coding may be below the noise floor for the reference receiver or may not be. Example coding may be the Y or M code of the GPS signaling used for military applications. The encryption or specific coding used is not known. Instead, the coding below the noise floor is estimated from the received target signal in act 104. In other embodiments, the coding or content of the target signal is known or observable, so the validation signal uses the known information to generate the validation signal. In act 106, the estimated or known coding is used as the validation data source or content representing the target signal. The validation signal is formed from this content, such as creating a digital signature or MAC of the content composited with a hash code link (see FIG. 4). The content and the digital signature or MAC are appended together to form the validation signal. The validation signal is then transmitted.

In act 110, the user receiver wirelessly receives a target signal. For example, the target signal with C/A code and Y or M code is received as a GPS signal. Other target signals from other GNSS, LEO or other constellations or other transmitters using code above the noise floor of the user receiver and code below the noise floor of the user receiver may be used. The received target signal may be converted to digital format and stored. The received target signal may be processed or used before validation.

In act 120, the user receiver wirelessly receives the validation signal. The generated validation signal is transmitted, such as by a GNSS, LEO, or other satellite or another transmitter. The user receiver receives the broadcast validation signal. The received validation signal includes the estimate of the coding or encryption below the noise floor or known target signal information.

The target signal and the validation signal may be from a same constellation or communications network, even from a same satellite. In alternative embodiments, different communications networks (e.g., GPS and LEO system) are used for the different target and validation signals.

In act 130, the user receiver or signal processor of the user equipment compares (e.g., correlates) the estimate of the coding spread below the noise floor or known target signal with the previously received and/or stored target signal. The part of the validation signal that includes the estimate of the coding below the noise floor (e.g., Y or M code) or known signal information is extracted and correlated with the target signal.

The validation signal may be verified, such as by using a later received hash chain link and digital signature or MAC check.

In act 140, the target signal is validated. When the comparison indicates a match (e.g., correlation peak from the correlation is aligned with the coding (e.g., C/A code of the target signal)), then the target signal is likely to be authentic (not a spoof signal). The correlation peak being aligned validates the target signal. The validation signal being verified by digital signal, MAC, and/or hash chain link validates the content (estimated code) used to correlate and validate. In another embodiment for GPS, the C/A code is not needed to have been received to trust the phase found from this correlation. If both estimates of the M or Y code and subframe data, both signed, are sent in the validation, navigation may be provided without C/A code. Galileo PRS codes may be used in another example.

In a further embodiment, the user receiver may be in a self-driving environment for autonomous vehicle operation. Using RF, vehicle-to-vehicle, Wi-Fi, short-range communications (DSRC) or another wireless communications, the receiver in a vehicle receives wireless signals from a transmitter, such as a transmitter in another vehicle or a tower (i.e., fixed in place transmitter). The validation signal is provided from other communications networks (e.g., LEO or cellular) or a different transmitter in the same communications network. For example, a reference receiver also receives the transmitted target signal and generates the validation signal.

The validation or authentication may be used in various environments, such as industrial (e.g., mining or factory navigation), automotive, marine, aerial, agricultural, telecommunications, or medical applications. With the proliferation of technology including sensors (e.g., RF, LIDAR, Internet of Things (IoT), etc.) and the on-going trends towards reduction of size, weight, and power (SWAP) of components, various wireless nodes are used in diverse systems including robotic, semi-autonomous, and autonomous applications, some with cooperating system nodes. The validation system discussed herein may be used with the wireless nodes to provide security. Any system using wireless communications may use the validation system. Wireless communication includes the transmission of information "over the air", without requiring cables, and can use a wide variety of waveforms and formats including electromagnet waves like infrared (IR), radio frequency (RF), satellite, microwave, wi-fi, mobile communication systems, Bluetooth, radar, Vehicle-to-Vehicle (V2V), short-range communications (DSRC), etc.) as well as future wireless technologies and protocols.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for validation of wireless signals, the method comprising:
    receiving wirelessly, at a receiver, a target signal from a first source, wherein the first source comprises a global positioning system satellite;
    receiving wirelessly, at the receiver, a validation signal from a second source different than the first source, the validation signal comprising (i) a digital signature or message authentication code of a composite of (a) data source bits from the target signal and (b) hash chain data and (ii) the data source bits, wherein the validation signal comprises an estimate of code bits from the first source, the estimate of the code bits being an estimate of modulation initially unknown to the receiver, wherein the modulation initially unknown to the receiver is Y or M code bits;
    verifying the validation signal with a digital signature, message authentication code, or reverse hash chain check; and
    validating the target signal from the verified validation signal, wherein validating comprises determining that a comparison of the estimate of the code bits matches the target signal where a correlation peak of the estimate with the target signal has a same phase as a C/A code peak of the target signal.

2. The method of claim 1 wherein receiving the target signal comprises receiving the target signal from a first satellite, wherein receiving the validation signal comprises receiving the validation signal from a second satellite, and wherein validating comprises validating the first source as a first satellite.

3. The method of claim 2 wherein receiving the validation signal from the second satellite comprises receiving from a low earth orbit satellite.

4. The method of claim 1 wherein the validation signal comprises a composition of (a) information for the target signal and/or first source and (b) the hash chain data as a hash chain link in a reverse hash chain and wherein verifying comprises verifying with the digital signature or the message authentication code.

5. The method of claim 1 wherein receiving the validation signal comprises receiving the validation signal where the validation signal is based on the target signal received in a spoof-free region or data received on a wired data link.

6. The method of claim 1 wherein the validation signal is formed from the digital signature or message authentication code of another digital signal or another message authentication code of values for a plurality of parameters of the target signal, wherein verifying comprises comparing the other digital signal or the other message authentication code, and wherein validating comprises comparing the values for the plurality of parameters extracted from the other digital signal or the other message authentication code with characteristics of the target signal or the first source.

7. The method of claim 1 wherein the validation signal is formed from the digital signature or message authentication code of another digital signal or another message authentication code of global positioning system (GPS) subframe data, wherein verifying comprises comparing the other digital signal or the other message authentication code, and wherein validating comprises comparing the GPS subframe data extracted from the other digital signal or the other message authentication code with GPS subframe data from the target signal.

8. The method of claim 1 wherein receiving the validation signal comprises receiving from the second source out-of-band from the first source.

9. The method of claim 1 wherein receiving the validation signal comprises receiving the validation signal as a second factor authentication where the second source is in a different constellation or communications network than the first source.

10. The method of claim 1 wherein the first and second sources are transmitters of a same constellation.

11. The method of claim 1 wherein receiving the target signal comprises receiving the target signal in a vehicle operating autonomously.

12. A method for validation of wireless signals, the method comprising:
    receiving wirelessly, by a first receiver, a target signal;
    receiving wirelessly, by the first receiver, a validation signal, the validation signal including coding estimated from information in the target signal where the coding is estimated from the information spread below a noise floor of the first receiver;
    comparing the coding with the target signal, wherein comparing comprises correlating the coding with the target signal where the match is a correlation peak from the correlating being aligned with the target signal; and validating the target signal when the comparing indicates a match.

13. The method of claim 12 wherein the validation signal includes (i)(a) a digital signature or (b) message authentication code of the estimated coding and a hash chain link and (ii) the estimated coding, and wherein validating comprises validating the target signal when the match occurs and the digital signal or message authentication code with the hash chain link is verified.

14. The method of claim 12 wherein the estimated coding comprises an estimated Y or M code, and wherein comparing comprises correlating the Y or M code with the target signal.

15. The method of claim 13 wherein receiving the target signal comprises receiving the target signal from a first satellite constellation, and wherein receiving the validation signal comprises receiving the validation signal from the first satellite constellation.

16. The method of claim 15 wherein receiving the target signal and the validation signal both comprise receiving from a same satellite of the first satellite constellation.

17. The method of claim 12 wherein receiving the validation signal comprises receiving from a low earth orbit satellite, and wherein receiving the target signal comprises receiving from a global navigation satellite system (GNSS).

18. The method of claim 12 further comprising:
receiving, by a reference receiver, the target signal;
estimating the coding spread below a noise floor from the target signal received at the reference receiver; and
forming the validation signal from the estimated coding.

19. The method of claim 12 wherein validating comprises verification using the hash chain link where the hash chain link is part of a reverse hash chain.

* * * * *

UNITED STATES PATENT AND TRADEMARK OFFICE
CERTIFICATE OF CORRECTION

PATENT NO. : 12,028,714 B1
APPLICATION NO. : 17/391647
DATED : July 2, 2024
INVENTOR(S) : Gregory Gutt et al.

It is certified that error appears in the above-identified patent and that said Letters Patent is hereby corrected as shown below:

In the Claims

Column 23 Claim 15 (Line 13):
"The method of claim 13 wherein receiving the target"
Should be replaced with:
"The method of claim 12 wherein receiving the target"

Signed and Sealed this
Tenth Day of September, 2024

*Katherine Kelly Vidal*

Katherine Kelly Vidal
*Director of the United States Patent and Trademark Office*